United States Patent [19]

Gruenberg et al.

[11] Patent Number: 4,959,887
[45] Date of Patent: Oct. 2, 1990

[54] CENTER PIVOT COVER

[75] Inventors: Eric I. Gruenberg, Soquel; James J. Halicho, Sunnyvale; Melvin J. Phillips, Cupertino; Troy K. Hulick, San Jose, all of Calif.

[73] Assignee: Apple Computer, Inc., Cupertino, Calif.

[21] Appl. No.: 352,777

[22] Filed: May 16, 1989

[51] Int. Cl.$^5$ ................................................ G06F 1/00
[52] U.S. Cl. ...................................... 16/223; 364/708
[58] Field of Search ................... 364/708; 16/376, 377, 16/374, 355, 356, DIG. 13, 223

[56] References Cited

U.S. PATENT DOCUMENTS

| | | | |
|---|---|---|---|
| 2,811,741 | 11/1957 | Miller et al. | 16/376 |
| 4,434,525 | 3/1984 | Labelle | 16/374 |
| 4,742,478 | 5/1988 | Nigro, Jr. et al. | 364/708 |
| 4,825,395 | 4/1989 | Kinser, Jr. et al. | 364/708 |

Primary Examiner—Richard K. Seidel
Assistant Examiner—James Miner
Attorney, Agent, or Firm—Blakely, Sokoloff, Taylor & Zafman

[57] ABSTRACT

An improved hinge assembly for a personal computer system. The hinge is comprised of a tubular portion which is rigidly connected to the cover unit of the computer. A part of the tubular hinge is left open to form a passageway into the cover unit. The tubular portion rotates relative to the main body section of the computer. The tubular portion has a longitudinal section removed from near its mid-point, forming a gap. This gap is closed by a curved cover element. The cover element is held stationary with respect to the main body section of the computer. Thus, when the cover unit is opened, the tubular portion rotates relative to the cover element. A cable connecting the electrical components in the cover unit to the main body section passes through an opening in the curved cover element, is bent, travels through the tubular section, parallel to its central axis, is bent again and passes into the cover unit.

10 Claims, 4 Drawing Sheets

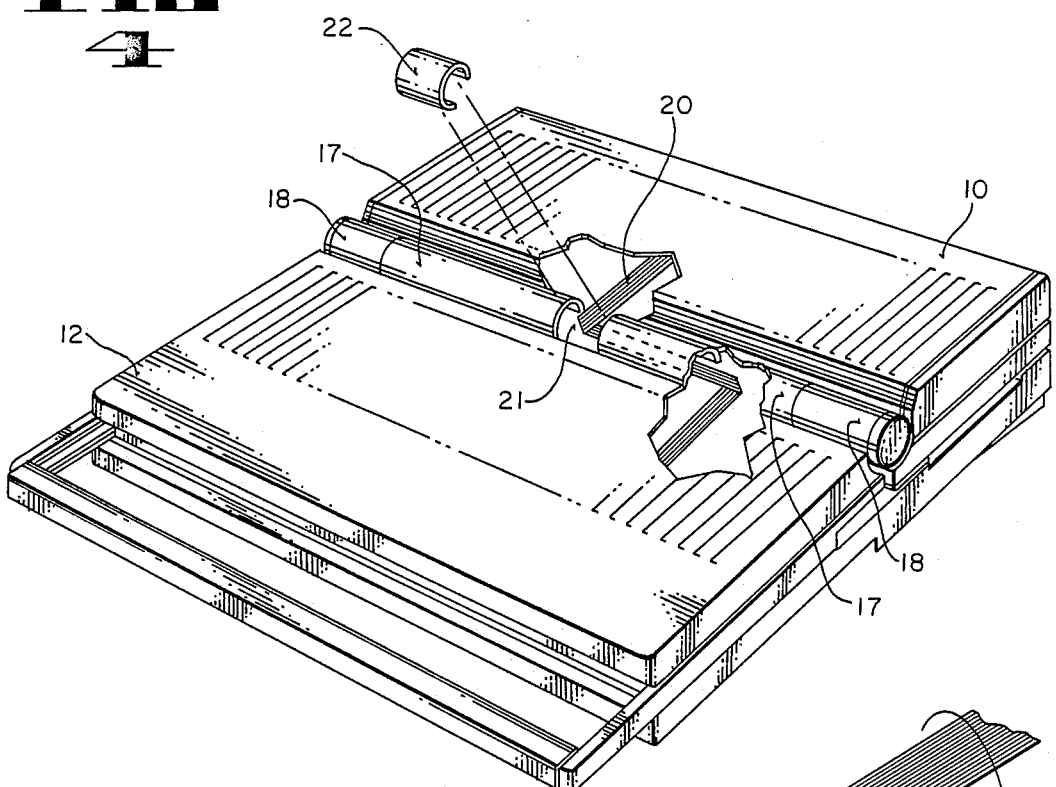
FIG 4
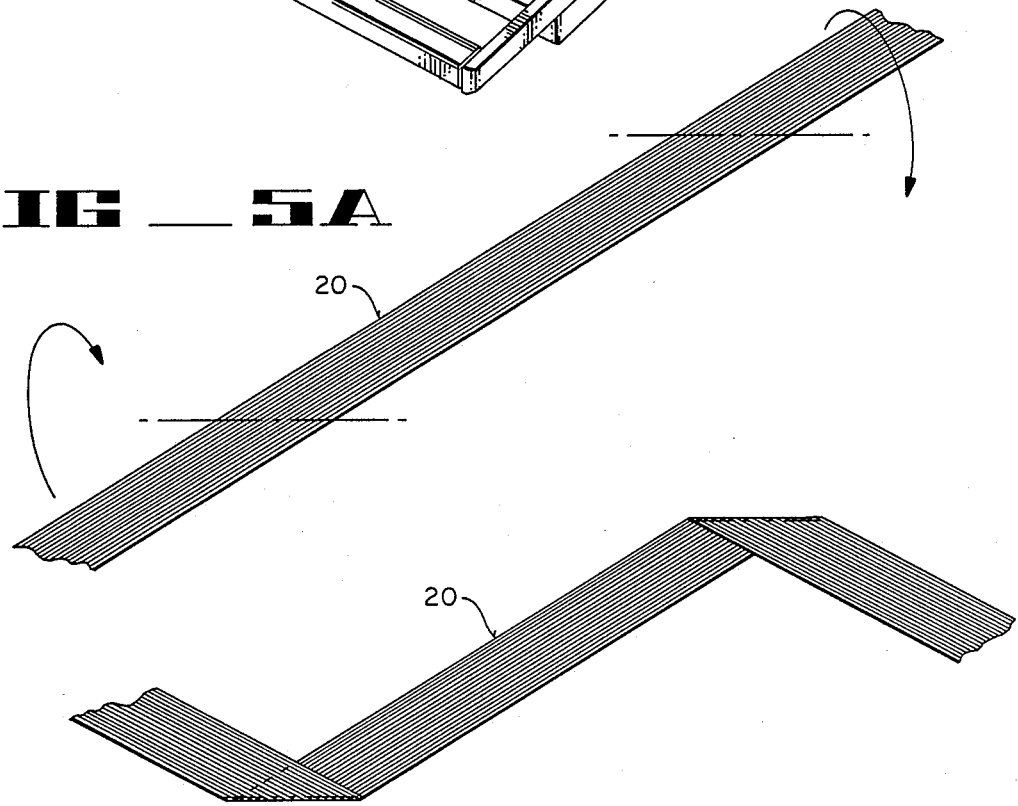
FIG 5A
FIG 5B

FIG_6
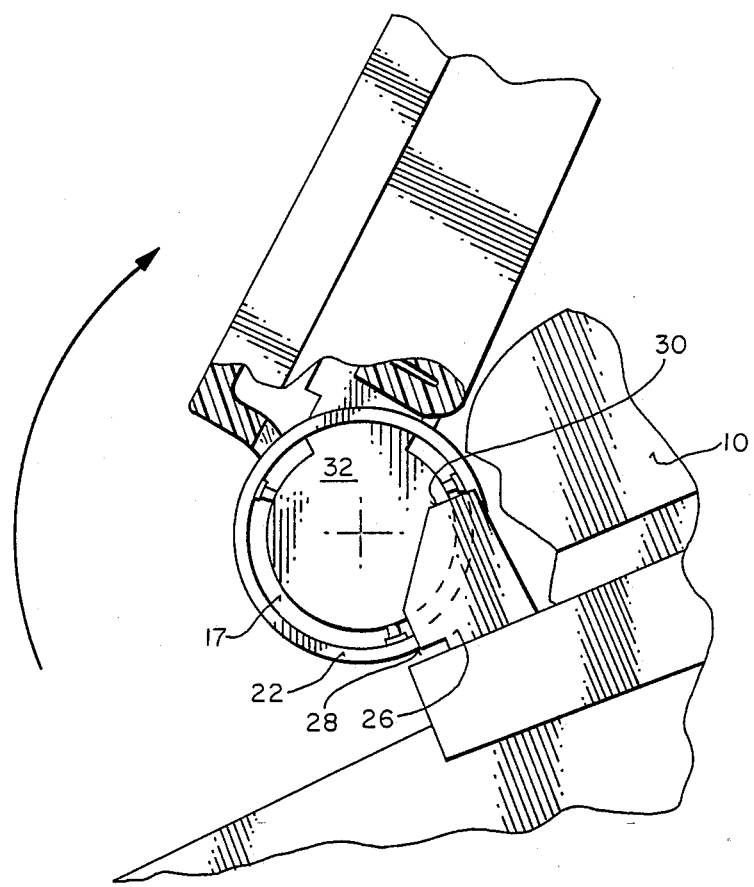
FIG_7
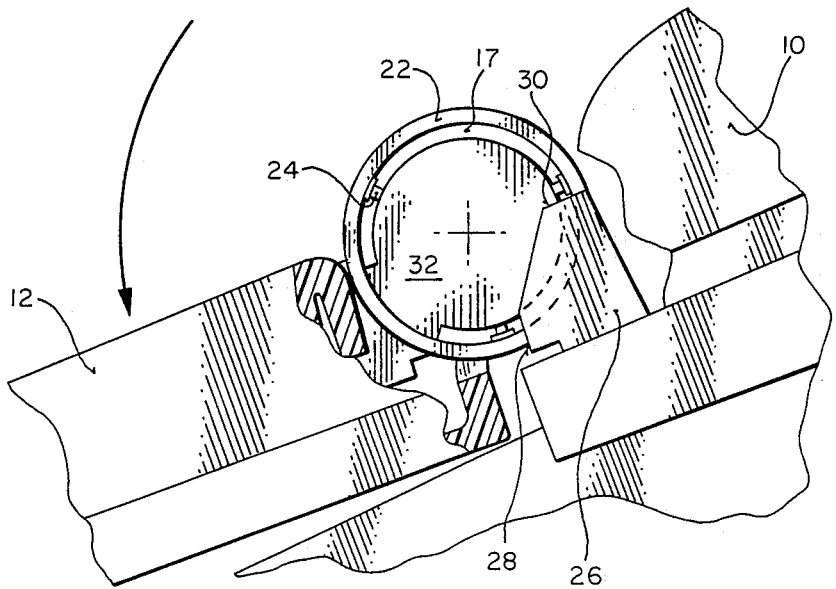

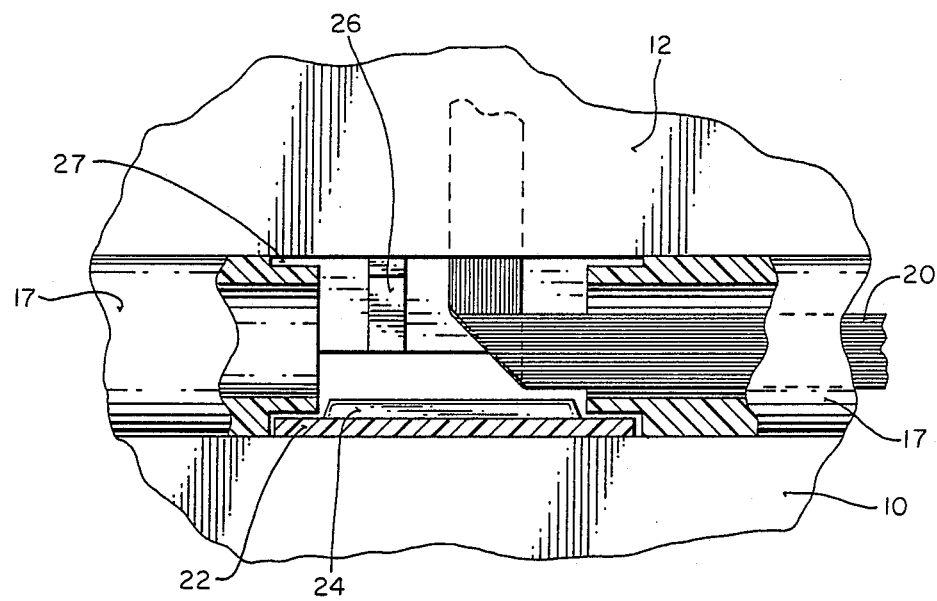
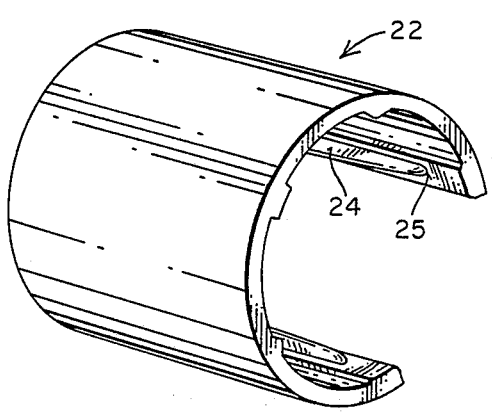
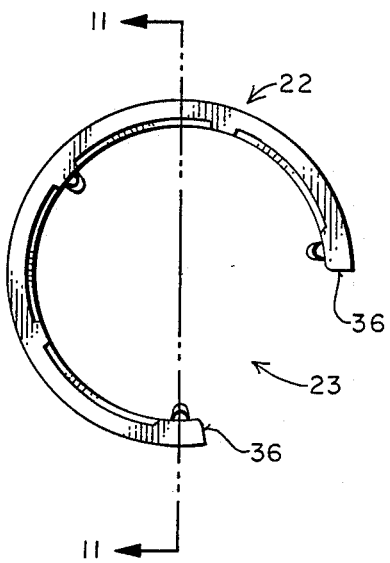
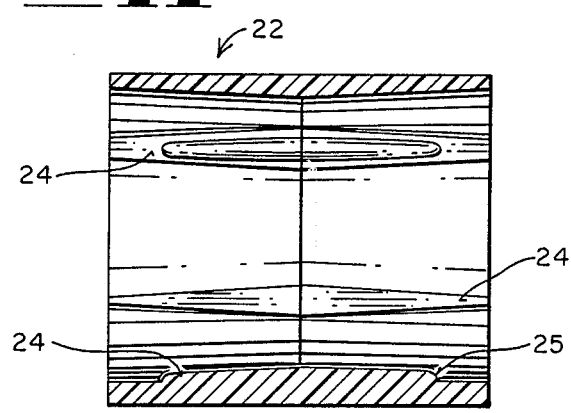

CENTER PIVOT COVER

BACKGROUND OF THE INVENTION

1. Field of the Invention:

The present invention relates to the field of hinge and connection devices, and more particularly to an improved hinge and cable assembly for a portable personal computer.

2. Art Background

In the field of personal computers, computers which are portable and may easily be carried from place to place are commonly referred to as "lap-top" computers. Typically lap-top computers are compact in size and relatively light in weight. Because of their portable nature, lap-top computers are usually configured differently then most other personal computer systems. A lap-top computer is usually a single, integrated, unit. All of the elements of the computer are placed within one housing. This is in contrast to most personal computer systems where the elements of the system, such as the keyboard, video display, and Central Processing Unit (CPU) are physically distinct entities. The integrated nature of lap-top computers is desirable because it enhances their portability.

Most lap-top computers have a main body section which contains all of the essential circuitry of the computer such as the CPU, the power supply, and data storage devices, such as a floppy or hard disk. Attached to the front of the main body section is a keyboard unit which allows a user to communicate with the computer. There is a top cover unit which is placed over the keyboard unit. The cover unit is connected to the main body section by a hinge. The hinge allows the cover to be opened upwards, revealing the keyboard.

The top cover unit performs several functions. First, when closed, it covers the keyboard, thus protecting the keys while the computer is being transported. The cover also usually holds the display unit of the lap-top. When the cover is lifted upwards, the display unit is visible to the user. In this manner, the display unit is also protected. The display unit can be a video monitor, a liquid crystal display, or any other equivalent device. Often, when the cover is rotated upwards the computer is turned on.

Because the computer's video display is located in the cover unit, there must be some method of communicating between the video display and the electronic circuitry in the main body section. The video display must be provided with a power supply as well as control signals for the actual display device. Typically, this communication is accomplished through the use of an electrical cable.

Several methods of routing the cable between the main body section and the cover unit are known in the prior art. However all of these previously disclosed arrangements have some form of an inherent limitation. In one method, for example, the cable simply exits the housing at some location near the hinge and then reenters the cover some distance away. This method is illustrated in FIG. 1. This method is obviously undesirable because it exposes the cable to the outside environment. Such exposure could easily lead to damage in the cable or even a potential electrical shock to a user of the computer.

In a second method known in the prior art, the cable is simply routed through the hinge in the manner as shown in FIG. 2. In this manner, the cable is covered. However, this method is also undesirable for several reasons. First, when the cover is opened and closed, the cable bends at point A. This repeated bending can lead to a work-hardening of the metal conductors within the cable. Eventually, the conductors can become brittle and break which will lead to a failure in the cable. Another drawback with this method is that the space provided for the cable within the hinge is very limited. As a result, the cable must be passed through the hinge before the connectors which are coupled to the ends of the cable are attached. Attaching the connectors while the cable is within the computer is a difficult task. As such, the time needed to manufacture the computer and its associated costs are both increased.

SUMMARY OF THE INVENTION

The present invention overcomes the limitations of the prior art by providing an improved hinge assembly for a portable personal computer. With the present invention the hinge is comprised of a tubular portion which is rigidly connected to the cover unit of the computer. A part of the tubular hinge is left open to form a passageway into the cover unit. The tubular portion rotates relative to the main body section of the computer. The tubular portion has a longitudinal section removed from near its mid-point, forming a gap. This gap is closed by a curved cover element. The cover element is held stationary with respect to the main body section of the computer. Thus, when the cover unit is opened, the tubular portion rotates relative to the cover element. A cable connecting the electrical components in the cover unit to the main body section passes through an opening in the curved cover element, is bent, travels through the tubular section, parallel to its central axis, is bent again and passes into the cover unit.

SUMMARY OF THE DRAWINGS

FIG. 4 is a view similar to FIG. 3 except that portions of the casing of the computer system have been cut away and the cover section is shown in exploded format.

FIGS. 5a and 5b illustrate the preferred embodiment of the cable which is used in the present invention.

FIG. 6 is a cross-sectional view of the hinge with the cover in the open position taken along the line 6—6 in FIG. 3.

FIG. 7 is a cross-sectional view of the hinge with the cover in the closed position taken along the line 6-6 in FIG. 3.

FIG. 8 is a top detail view of the hinge showing how the cover section is coupled to the tubular portions.

FIG. 9 illustrates the cover section as used in the present invention.

FIG. 10 is a side view of the cover section.

FIG. 11 is a cross sectional view of the cover section taken along the line 11—11 in FIG. 10.

DETAILED DESCRIPTION OF THE INVENTION

A center pivot cover for use in a portable personal computer system is described. Throughout the following specification, various details such as specific component shapes and arrangements, are set forth in order to provide a more complete description of the present invention. In other instances well known elements and methods of manufacture are not described in detail so as not to obscure the present invention unnecessarily. Moreover, throughout the following specification, the present invention is described with reference to to use in a portable personal computer system. It will be apparent to those skilled in the art, however, that the center pivot cover and hinge arrangement can be adopted for use in any electronic system that contains two or more elements which must be movably connected together.

Figure 1:
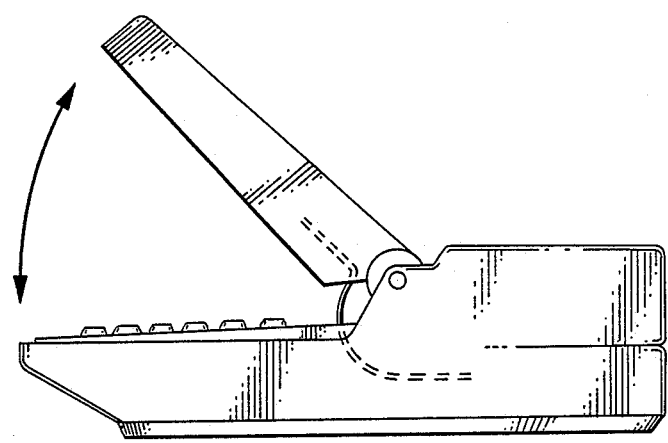
FIG. 1 is an illustration of a cable routing arrangement that was used in the prior art.
Figure 2:
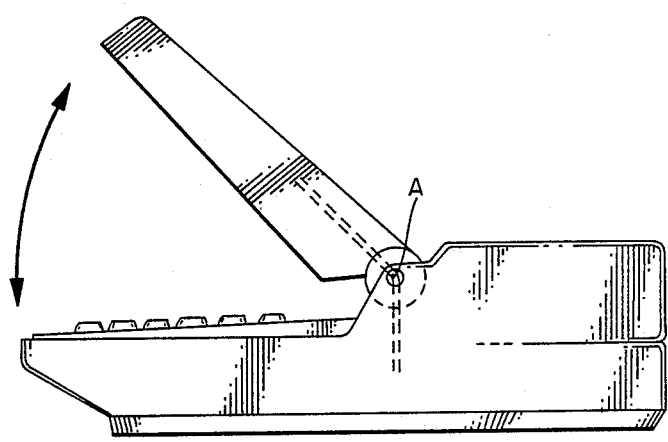
FIG. 2 is an illustration of an alternative cable routing arrangement that was also used in the prior art.
Figure 3:
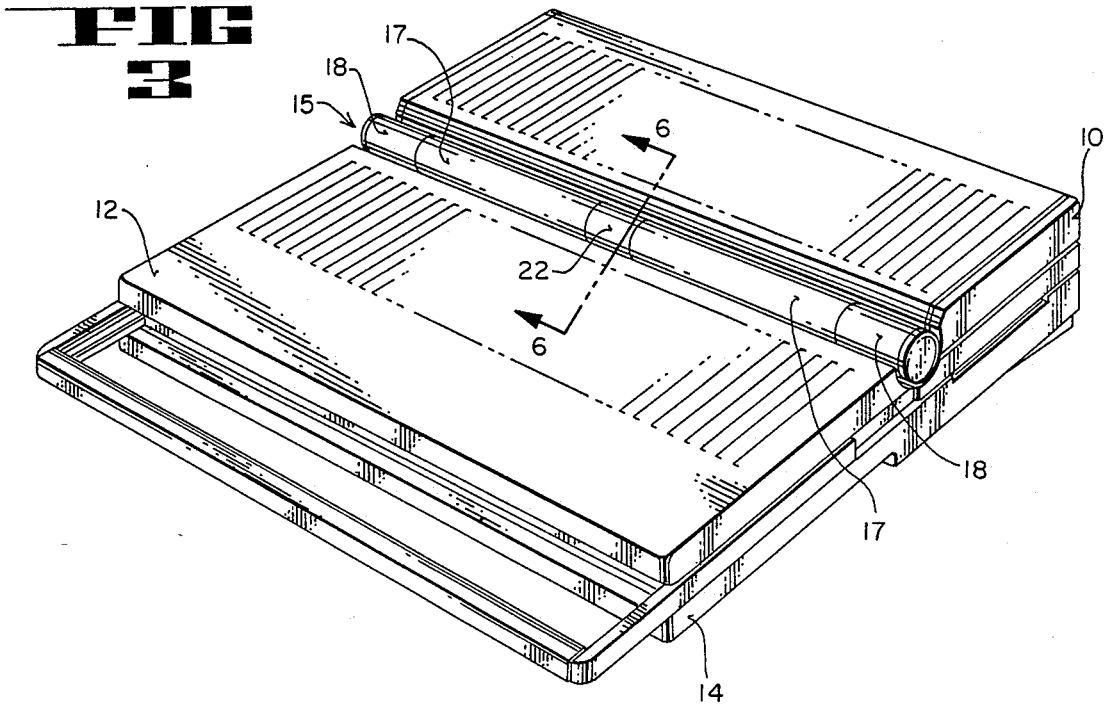
FIG. 3 shows a portable personal computer system that employs the center pivot cover of the present invention.

Referring first to FIG. 3, a perspective view of a portable personal computer system using the center pivot cover of the present invention is shown. The computer system consists of the main body section 10 and a cover unit 12. In FIG. 3 the cover unit is shown in a closed position. However, the cover unit rotates upward to an open position. In the open position the keyboard and the video display of the computer system are exposed. The keyboard is contained in the keyboard section 14 which is located underneath the cover unit 12.

The cover unit 12 is connected to the main body section 10 by means of a hinge 15. The hinge is cylindrical in shape with a substantially circular cross-section. In the preferred embodiment, it extends substantially across the entire width of the computer system. It will be apparent to those skilled in the art, however, that the hinge is not required to extend across the entire width of the computer system and that the same results can be achieved with a hinge that covers only part of the computer system. The hinge comprises two tubular portions 17, a curved cover element 22 and two clutch units 18. The tubular portions 17 are rigidly connected to the cover section 12. The clutch units 18 are disposed at opposite ends of the hinge 15 and are rigidly connected to the main body section 10. The hinge is connected to each of the clutch units and rotates with respect to the clutch units 18. The clutch units contain a mechanism which hold the cover unit 12 in place after it has been opened. The term "center pivot cover" refers to the hinge and cover element arrangement that is used in the present invention.

Referring next to FIG. 4, a second perspective view of the computer system is shown. In this illustration, portions of the casing of the computer system have been cut away so as to more clearly illustrate the interior details of the computer and the relationship of the curved cover element 22 to the various other elements of the computer system. In FIG. 4, the curved cover element 22 removed from the computer system with the phantom lines indicating how the cover section is coupled to the hinge. As can be seen, a longitudinal gap 21 is present between the two tubular sections 17. This gap is covered and closed by the cover section 22. FIG. 4 also illustrates how the cable 20 passes through the hinge 15 and into the cover unit 12.

FIG. 8 illustrates a top detail view of the computer system showing how the cover element 22 is coupled to the tubular portions 17 and the hinge 15. FIG. 4 also illustrates how the cover element 22 is coupled to the tubular portions. The cover element is simply snapped into place to cover the gap 21 between in the tubular portions 17 of the hinge 15. The cover piece is not fixed to the tubular portions 17, but is free to move relative thereto. In FIG. 8, various sections of the tubular portions 17 and the curved cover element 22 have been cut away in order to more clearly show the elements of the present invention. As can be seen, the ends of the tubular portions 17 are of a smaller diameter than the main body of the tubular portions. This reduction in diameter provides a recessed area 27 into which the cover section 22 is placed. The recessed area 27 works together with the stiffeners 24 located on the inner surface of the cover section 22 to properly locate the cover section 22. When the cover section is in place, it entirely covers the gap 21 between the tubular portions 17. As described in more detail below, the opening 23 in the cover section is held fixed so as not to be visible by a user of the computer system. Also, in the preferred embodiment, the cover element has a diameter which is substantially equal to the diameter of the tubular portions. In this manner, it appears as though the hinge is one seamless unit to the user of the computer system.

FIGS. 9 through 11 illustrate the curved cover element 22 which is used in the present invention to close the longitudinal gap 21 between the tubular portions 17 of the hinge 15. In crosssection the curved cover piece has a shape which comprises a portion of the arc of a circle, An opening 23 is left between the ends 36 of the cover. The cable 20 passes through this opening. The exterior surface of the preferred embodiment of the cover is relatively smooth. The interior surface has located on it a plurality of stiffeners 24 to help maintain the shape of the cover piece 22. The stiffeners 24 are simply raised portions that are formed integrally with the cover piece. The stiffeners 24 are disposed longitudinally along the interior surface and are substantially parallel to the central axis of the hinge 15. The stiffeners 24 do not extend all the way to the edge of the cover piece. Instead there is a gap between the end of the stiffeners 24 and the edge of the cover piece 22. This gap forms a shoulder portion 25. When the cover section is coupled to the tubular portions 17 of the hinge, the shoulder acts as a stop to keep the cover piece properly located in the longitudinal direction. In the preferred embodiment, the cover section is manufactured from injection molded plastic.

When the computer is in its assembled form; the cover element 22 is held in a fixed orientation with respect to the main body section 10 of the computer. This is best illustrated with reference to FIGS. 6 and 7. In FIG. 7, the cover unit is closed. In FIG. 6 it is open. The curved cover element 22 is prevented from moving by physical stop member 26. This element is an extended arm which projects upwardly from the base of the main body section 10. In the preferred embodiment, the physical stop member is manufactured from injection molded plastic. The physical stop member has a vertical surface 28, and a horizontal surface 30 which contacts the edges of the curved cover element 22. This prevents the cover element from moving when the cover unit 12 is opened and closed. Thus, regardless of the position of the cover unit 12, the curved cover element is always oriented so that the opening 23 is located inside of the computer system and is not visible to the user.

Referring again to FIG. 8, the relationship between the cover element 21 and the physical stop member 26 is further illustrated. As can be seen, the physical stop member 26 is relatively narrow and does not take up the entire width of the cover section. Instead, the cable 20 is inserted into the hinge at this point. The manner in which the cable is routed into the hinge is described in more detail below.

Referring again to FIGS. 6 and 7, two cross-sectional views of the hinge 15 and cover unit 12 are shown. As can be seen, the tubular portion 17 is not a complete circle. Where it is connected to the cover unit 12, there is a passageway 32. Passageway 32 is present to allow the cable to pass from the hinge 15 into the cover unit 12. The tubular portion 17 has a relatively thin surface wall. It may also contain reinforcing panels (not shown) to help maintain the cylindrical shape of the hinge.

One of the major advantages of the present invention is that it allows the cable 20 connecting the electronic components in the main body section 10 and the cover unit 12 to be routed in a manner that is easy to assemble and does not place a large amount of strain on the cable. The cable 20 enters the hinge 15 through the gap 23 in the curved cover piece 22. In the preferred embodiment, the cable 20 is a flat cable with a plurality of parallel conductors. This type of cable changes direction by being folded along approximately a 45° line so that it makes a right angle bend. After the cable enters the hinge, it is bent so as to travel substantially parallel to the central axis of the hinge 15. The cable 20 extends a predetermined length through the hinge. At that point, the cable is bent again and passes into the cover unit 12, through passageway 32, where it converts to the electronic components associated with the video display of the computer system. The manner in which the cable is folded in the preferred embodiment is shown in FIGS. 5a and 5b.

This arrangement of the cable 20 is advantageous in that it does not place a large amount of strain on the cable when the cover unit is opened and closed. In this arrangement, the cable 20 twists along the entire length which is in the hinge whenever the cover unit 12 is moved. This is in contrast to the prior art where the cable would bend at a single point. By twisting along a length, the conductive elements in the cable are not subjected to work hardening and therefore do not become brittle over time. This leads to a longer, useful life for the cable. Another advantage of the present arrangement is that the cable can be completely assembled before it is placed in the computer system. It is not necessary to add connectors to the cable after it has been placed in the computer. That manufacturing step can be accomplished while the cable 20 is outside the computer. This greatly simplifies the manufacture of the computer system.

What is claimed is:

1. An improved hinge assembly for use in a computer system, said computer system having at least a main body section and a cover unit comprising:
    a hinge means fixedly coupled to said cover unit, said hinge means having removed therefrom a longitudinal section so as to form a gap;
    a cover means movably coupled to said hinge means, covering said gap;
    a stop means coupled to the main body section for holding said cover section in a fixed orientation relative to the main body section.

2. The device of claim 1 wherein said cover means has formed, therein an opening so as to allow a cable to be passed through said opening, through said hinge means and into said cover unit.

3. The device of claim 1 wherein said hinge, said cover section and said stop member are manufactured from injection molded plastic.

4. An improved hinge assembly for use in a portable personal computer system, said hinge assembly comprising:
    first and second substantially hollow tubular portions fixedly coupled to a cover unit of the computer system, said first and second tubular portions being arranged so as to form a gap therebetween:
    mounting means coupled to said first and second tubular portions for rotatably coupling said cover unit to a main body section of said computer system;
    a curved cover element movably coupled to said first and second tubular portions, covering said gap, said cover section having formed therein an opening;
    a stop member coupled to said main body section and contacting said curved cover element so as to hold said curved cover element in a fixed orientation with respect to said main body section.

5. The device of claim 4 further comprising a cable, said cable passing through said opening in said curved cover element, entering one of said tubular portions, and travelling into said cover unit so as to electrically connect electronic components in said cover unit and said main body section.

6. The device of claim 4 wherein said first and second tubular portions and said curved cover element are all substantially circular in cross section, and have substantially identical cross sectional diameters.

7. The device of claim 4 wherein said stop member comprises an extended arm coupled to, and rising upwards from, a base of said main body section.

8. The device of claim 5 wherein said cable comprises a flat cable with a plurality of parallel conductors.

9. The device of claim 4 wherein said curved cover element is movably coupled to said tubular portions by being placed around a recessed end of each of said tubular portions.

10. The device of claim 4 wherein said tubular portions, said curved cover element, and said stop member are all manufactured from injection molded plastic.

* * * * *